(12) United States Patent
Wu et al.

(10) Patent No.: US 6,724,375 B2
(45) Date of Patent: Apr. 20, 2004

(54) HAND WRITING INPUT DEVICE FOR CELLULAR PHONE

(75) Inventors: Yuan-Heng Wu, Hisn Tien (TW); Chien-Feng Wang, Hisn Tien (TW)

(73) Assignee: Ace Cad Enterprise Co., Ltd., Taipei Hsien (TW)

( * ) Notice: Subject to any disclaimer, the term of this patent is extended or adjusted under 35 U.S.C. 154(b) by 265 days.

(21) Appl. No.: 10/054,876

(22) Filed: Jan. 25, 2002

(65) Prior Publication Data

US 2003/0117381 A1 Jun. 26, 2003

(30) Foreign Application Priority Data

Dec. 20, 2001 (TW) ........................................ 90222378 U

(51) Int. Cl.[7] ................................................. G09G 5/00
(52) U.S. Cl. ................. 345/179; 178/18.03; 178/19.01; 455/550.1; 455/556.1
(58) Field of Search ................................. 345/157, 179; 178/18.03, 19.01, 19.05, 20.01; 455/550.1, 556.1, 556.2, 557, 558

(56) References Cited

U.S. PATENT DOCUMENTS

| | | | | |
|---|---|---|---|---|
| 6,002,387 A | * | 12/1999 | Ronkka et al. | 345/157 |
| 6,427,078 B1 | * | 7/2002 | Wilska et al. | 455/550.1 |
| 2002/0057824 A1 | * | 5/2002 | Andreasson | 382/101 |
| 2002/0082043 A1 | * | 6/2002 | Wilska et al. | 255/550 |
| 2003/0138144 A1 | * | 7/2003 | Lynggaard | 382/181 |

* cited by examiner

*Primary Examiner*—Amare Mengistu
(74) *Attorney, Agent, or Firm*—Dennison, Schultz, Dougherty & MacDonald

(57) ABSTRACT

A hand writing input device for cellular phone disclosed herein is an input device which digital tablet can be in combined use with a cellular phone. In this device, a digital pen is used to input data such as handwritings or graphic data instead of entering through a key pad of cellular phone, forming an e-mail, a brief message, a document, which may be locally stored or further transmitted to another cellular phone via transmitter station or via internet to overcome the disadvantage and limit of entering data from key pad of cellular phone.

7 Claims, 3 Drawing Sheets

HAND WRITING INPUT DEVICE FOR CELLULAR PHONE

BACKGROUND OF THE INVENTION

1. Field of the Invention

The present invention relates to hand writing input device for cellular phone, and more particularly, to a hand writing input device with digital tablet which can be combined with a cellular phone to directly input hand written information from a digital tablet to the cellular phone without using key pad on the cellular phone to input data.

2. Description of the Prior Art

The cellular phone has become a prevailing communication apparatus nowadays. It is not only capable of communicating by voices but also capable of transmitting messages, so the cellular phone users may choose to send messages instead of speaking on the phone. There are many cutting-edge functions available nowadays. In addition to infrared ray transmission, internet connection is also provided on cellular phones so the users can retrieve data or send emails or download graphic data or text from web sites. Cellular phone has become a basic tool in daily life.

Although cellular phone has many auxiliary functions, users can only input data through key pad on the said phone, which is a quite time consuming effort when keying. Besides, data in graphic form or in handwriting form are not acceptable to cellular phone, which, accordingly, allows rooms for improvements.

The inventor has endeavored for years carrying out studies and experiments and come to propose the present invention.

SUMMARY OF THE INVENTION

It is an object of the present invention to provide a hand writing input device for cellular phone by which the writings or graphic data can be reappeared or displayed on the screen of cellular phone in order for users to proceed with transmission or storage of said displayed data.

It is another object of the present invention to provide a hand writing input device for cellular phone. With this device, the handwritings or graphic data can be converted into computer recognized characters and then displayed on the screen of cellular phone in order to enable the users for transmission or storage of data.

It is still another object of the present invention to provide a hand writing input device for cellular phone. With this device a digital pen containing ink or ink cartridge or a digital inking pen can be used to write on a paper laid on the top of digital tablet. So the users can have duplicate copy of the input data, one stored on cellular phone and one on hard copy.

Another object of the present invention is to provide a practical hand writing input device for cellular phone, which can greatly reduce time and effort when users input data to cellular phone.

To achieve these and other aforesaid objects, the gist of the present invention is directed to provide a hand writing input device for cellular phone comprising a digital tablet and a digital pen. The digital pen further comprises an electromagnetic signal emitting circuit which emits signals when digital pen is pressed against digital tablet for input, while the digital tablet comprises wire grid formed by two perpendicular sets of parallel conducting wires to receive electromagnetic signal from the digital pen when it pressed against the tablet and to induce current signal. This current signal is further transmitted to signal selector contained in the digital tablet and then the signal is amplified by a signal amplifier contained in the digital tablet. The amplified current signal is converted to a digital signal by an analog/digital converter in the digital tablet, and is treated in a micro controller in the digital tablet to convert the signal to data of the coordinate for the position and relative information. Data of coordinate for the position and relative information can be stored and collected to form further track data. Single datum of coordinate or track data then can be transmitted either by wire or wireless through transmission interface therein to cellular phone. These data are treated by the application program module or the driver and are converted into graphic data, hand written form, or computer recognized characters thereby forming an e-mail, or a brief message, or a document. These data can be sent to any desired destination or stored in the cellular phone through transmission/storage module.

BRIEF DESCRIPTION OF THE DRAWINGS

The drawing disclose an illustrative embodiment of the present invention which serves to exemplify the various advantages and objects hereof, and are as follows.

DETAILED DESCRIPTION OF THE PREFERRED EMBODIMENT

Figure 1:
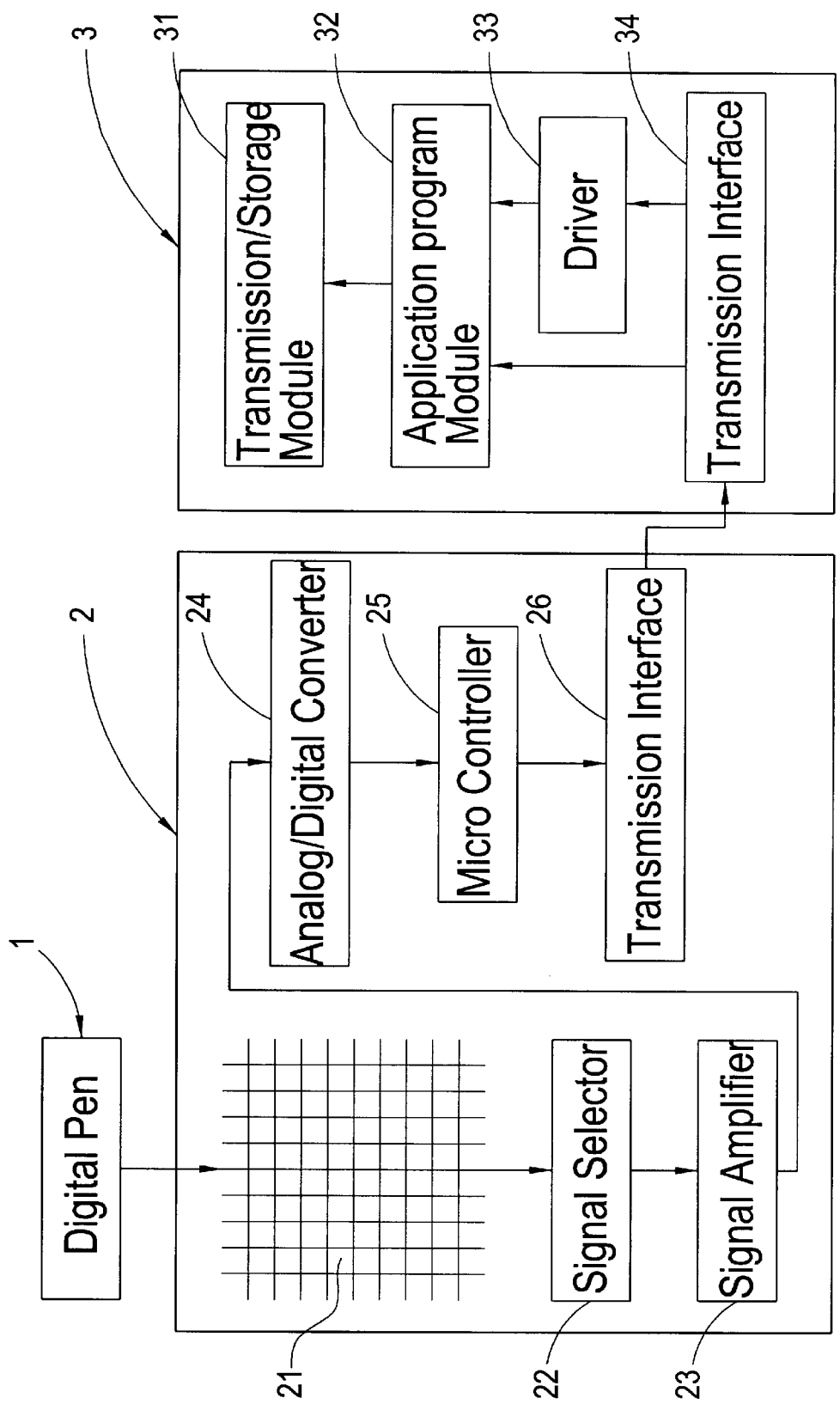
FIG. 1 is a block diagram in which the operational flow chart of the present invention is shown.

Referring to FIG. 1, as shown in the blocks, the hand writing input device for cellular phone according to the present invention comprises: a digital pen 1 containing an electromagnetic signal transmitting circuit for emitting electromagnetic signals when writing or drawing on a digital tablet 2 with the digital pen 1; the digital tablet 2 further including a signal selector 22, a signal amplifier 23, an analog/digital converter 24, a micro controller 25, and a transmission interface 26, wherein a wire grid 21 formed of two perpendicular sets of parallel conducting wires is provided on the digital tablet 2. When writing or drawing on the digital tablet 2 with the digital pen 1, the electromagnetic signal emitting from the digital pen 1 is received by the wire grid 21, such that current signals are induced in wire grid whereat the digital pen 1 and digital tablet 2 are contacted. The selected current signal from the signal selector 22 is amplified by the signal amplifier 23 and then the amplified current signal is converted to a digital signal by the analog/digital converter 24, and is treated in the micro controller 25 to form data of the coordinate for the position and relative information. The single datum of coordinate or track data from collected information can be transmitted by wire or wireless to the cellular phone 3 through the transmission interfaces 26, 34 respectively in the digital tablet 2 and the cellular phone 3. The transmission can be either in wired or in wireless transmission form. The wired form may be in RS-232, USB, regular cellular phone interface specification, or IEEE 1394, while the wireless form may be in IR, RF or bluetooth. Cellular phone 3 at least comprises a transmission interface 34, a driver 33 or a application program module 32, and a transmission/storage module 31. These data are then treated by the application program module 32 or the driver 33 and are converted into graphic data, hand written form, or computer recognized characters through a handwriting recognition software thereby forming an e-mail, or a brief message, or a document. These data can be sent to any desired destination or stored in the cellular phone 3 by the transmission/storage module 31.

Figure 2:
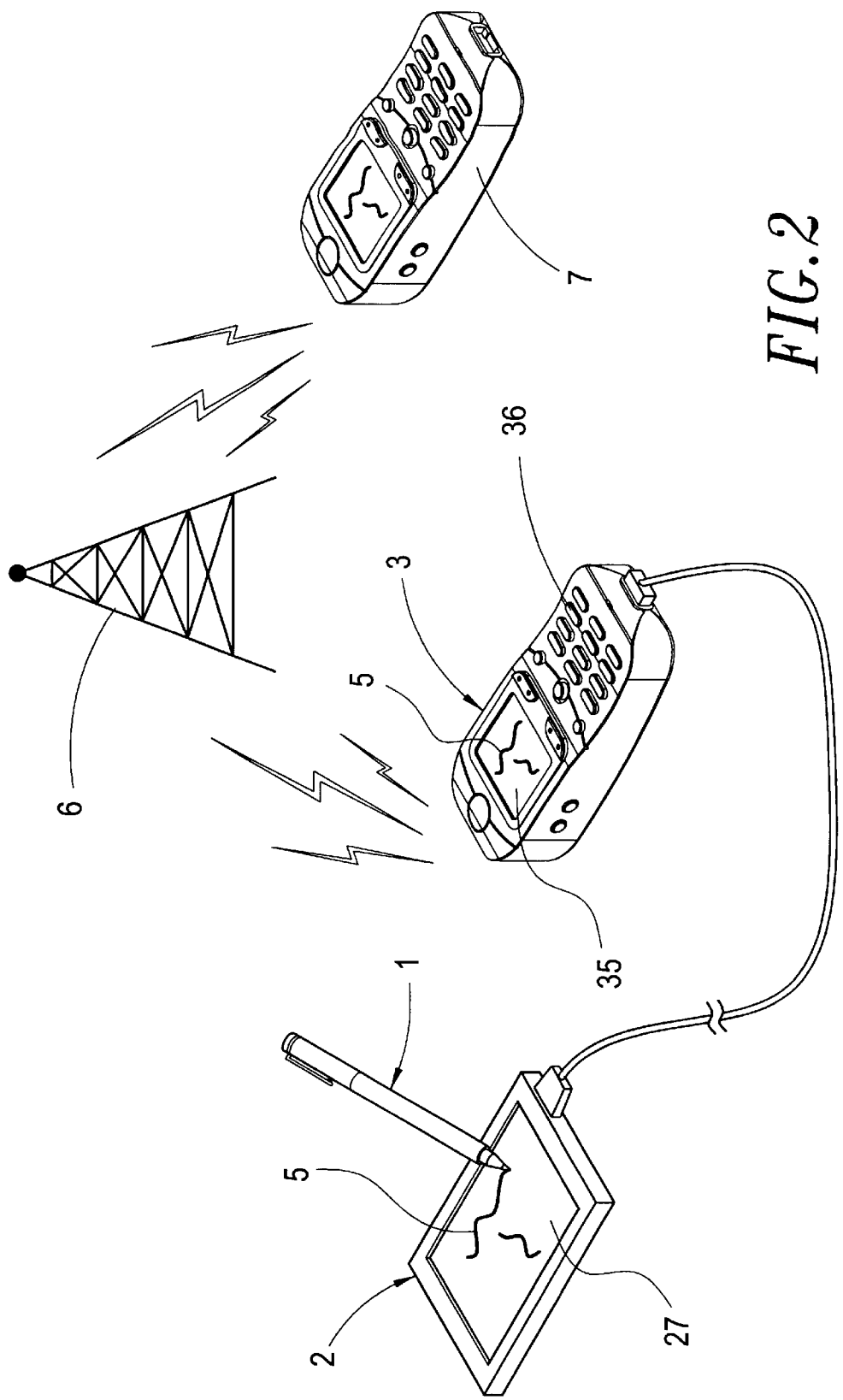
FIG. 2 is a schematic view showing a first embodiment of the present invention.

Referring to FIG. 2, in this first embodiment of the present invention the digital tablet 2 is combined with the cellular phone 3, without affecting existing original components of the cellular phone 3. The information is entered into the cellular phone 3 without keying from the pad 36 on the cellular phone 3, instead, handwriting or graphic data 5 are directly input on the surface 27 of the digital tablet 2 with the digital pen 1, and the aforesaid handwriting or graphic data 5 will reappear as hand written form on the screen 35 of the cellular phone 3 or reappear as computer recognized characters via a handwriting recognition software depending on the actual requirements. Meanwhile, it is optional when transmitting from the digital tablet 2 to cellular phone 3. The users may either choose synchronous transmission with input action or asynchronously transmission after completion of a series of input action, which depends on the hardware specification of cellular phone. Besides, the information may be transmitted to another cellular phone 7, or email box via a transmitter station 6 or via the internet. If it is desirable, the information may be stored locally in the user's own phone 3.

Figure 3:
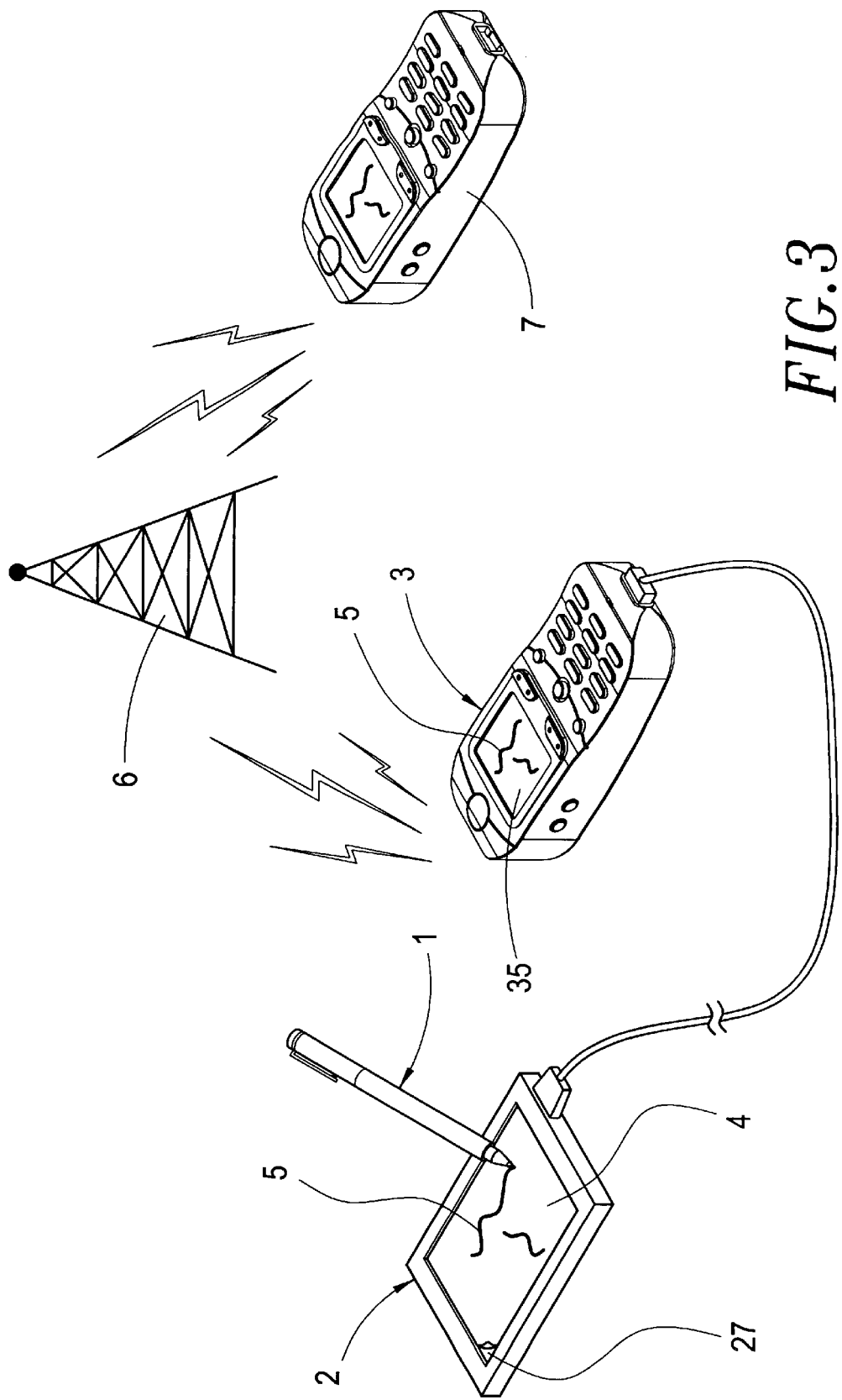
FIG. 3 is a schematic view showing a second embodiment of the present invention.

Referring to FIG. 3, in the second embodiment of the present invention, in addition to emitting electromagnetic signal, the digital pen 1 may be made containing ink or ink cartridge or a digital inking pen capable of writing on a sheet of paper 4 laid on the surface 27 of the digital tablet 2 so that the data may be preserved on the paper 4 as a hard copy of the input data and can be used for future reference. As for transmitting data, it is similar to the first embodiment described above accompanying with FIG. 2.

Obviously, the present invention has the following noteworthy advantages:

1. The present invention can be combined with cellular phone to allow the data to be input from the digital tablet directly and transmitted to the cellular phone to improve the input device limited by the design of conventional cellular phone.
2. The handwriting or graphic data are able to be displayed or reappear as hand written form on the screen of the cellular phone for users to store or transmit.
3. Processed by a handwriting recognition software, the entered handwriting or graphic data can be converted to computer recognized character and shown on screen of cellular phone for further transmission or storage in the cellular phone.
4. A digital pen containing ink cartridge or ink or a digital inking pen may be used to write directly on a paper laid on the digital tablet for the users to keep a hard copy of the input data.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A hand writing input device for cellular phone comprising:
    a digital pen containing at least an electromagnetic signal emitting circuit;
    a digital tablet containing a signal selector, a signal amplifier, an analog/digital converter, a micro controller, and a transmission interface, and a wire grid formed of two perpendicular sets of parallel conducting wires being provided on the surface of said digital tablet;
    by using said digital pen to input on said digital tablet, the electromagnetic signal emitted from said digital pen is received by said wire grid on said digital tablet so that current signals are induced in said wire grid whereat said digital pen and said digital tablet contacts each other, said selected current signal is amplified by said signal amplifier after passing through said signal selector, then said amplified current signal is converted to a digital signal by said analog/digital converter, and is treated in said micro controller to form data of the coordinate for the position and relative information, these data then are transmitted to said cellular phone through said transmission interface of said digital tablet and received by transmission interface of said cellular phone, these data are then treated by said cellular phone and are converted into hand written form, graphic data, or computer recognized characters through a handwriting recognition software thereby forming an e-mail, or a brief message, or a document, these data can be sent to any desired destination or stored in the cellular phone through a transmission/storage module.

2. The device of claim 1, wherein said data together with its coordinate in said micro controller can be collected and stored in accordance with said cellular phone specification to form track data and then transmitted to said cellular phone.

3. The device of claim 1, wherein said data together with its coordinate in said micro controller can be synchronously transmitted with input action in accordance with said specification of cellular phone to said cellular phone.

4. The device of claim 1, wherein said transmission interface for said digital tablet or said transmission interface for said cellular phone can be a wire transmission interface.

5. The device of claim 1, wherein said transmission interface for said digital tablet or said transmission interface for said cellular phone can be a wireless transmission interface.

6. The device of claim 1, wherein said digital pen can contain ink or ink cartridge for writing or drawing.

7. The device of claim 1, wherein a paper can be laid on the surface of said digital tablet for writing or drawing on said paper with said digital inking pen to keep hard copy of input data.

* * * * *